United States Patent [19]

Marsh et al.

[11] Patent Number: 5,050,220

[45] Date of Patent: Sep. 17, 1991

[54] OPTICAL FINGERPRINT CORRELATOR

[75] Inventors: Ronald A. Marsh, Ridgecrest, Calif.; George S. Petty, Jamestown, N.C.

[73] Assignee: The United States of America as represented by the Secretary of the Navy, Washington, D.C.

[21] Appl. No.: 556,224

[22] Filed: Jul. 24, 1990

[51] Int. Cl.⁵ .............................................. G06K 9/74
[52] U.S. Cl. ......................................... 382/4; 382/32; 382/43; 250/550; 359/561
[58] Field of Search ......................... 382/4, 32, 42, 43; 250/550; 350/162.12, 162.13, 3.68

[56] References Cited

U.S. PATENT DOCUMENTS

| | | | |
|---|---|---|---|
| 4,637,056 | 1/1987 | Sherman et al. | 382/31 |
| 4,837,843 | 6/1989 | Owechko | 382/31 |
| 4,876,725 | 10/1989 | Tomko | 350/162.12 |
| 4,949,389 | 8/1990 | Allebach et al. | 350/162.13 |

Primary Examiner—Michael Razavi
Assistant Examiner—Yon Jung
Attorney, Agent, or Firm—Sol Sheinbein; Melvin J. Sliwka; Harvey A. Gilbert

[57] ABSTRACT

A high-speed optical fingerprint correlator. The invention uses the unknown fingerprint to produce a matched filter for autocorrelation and detecting and displaying the resultant indicia of correlation, the correlation peaks produced. The matched filter is produced by performing digital Fourier transform on the optically scanned digitized image input of the unknown print. The matched filter is then multiplied with the optically performed Fourier transforms on the reconstructed known fingerprint images provided in digital format from visual or digital storage.

16 Claims, 1 Drawing Sheet

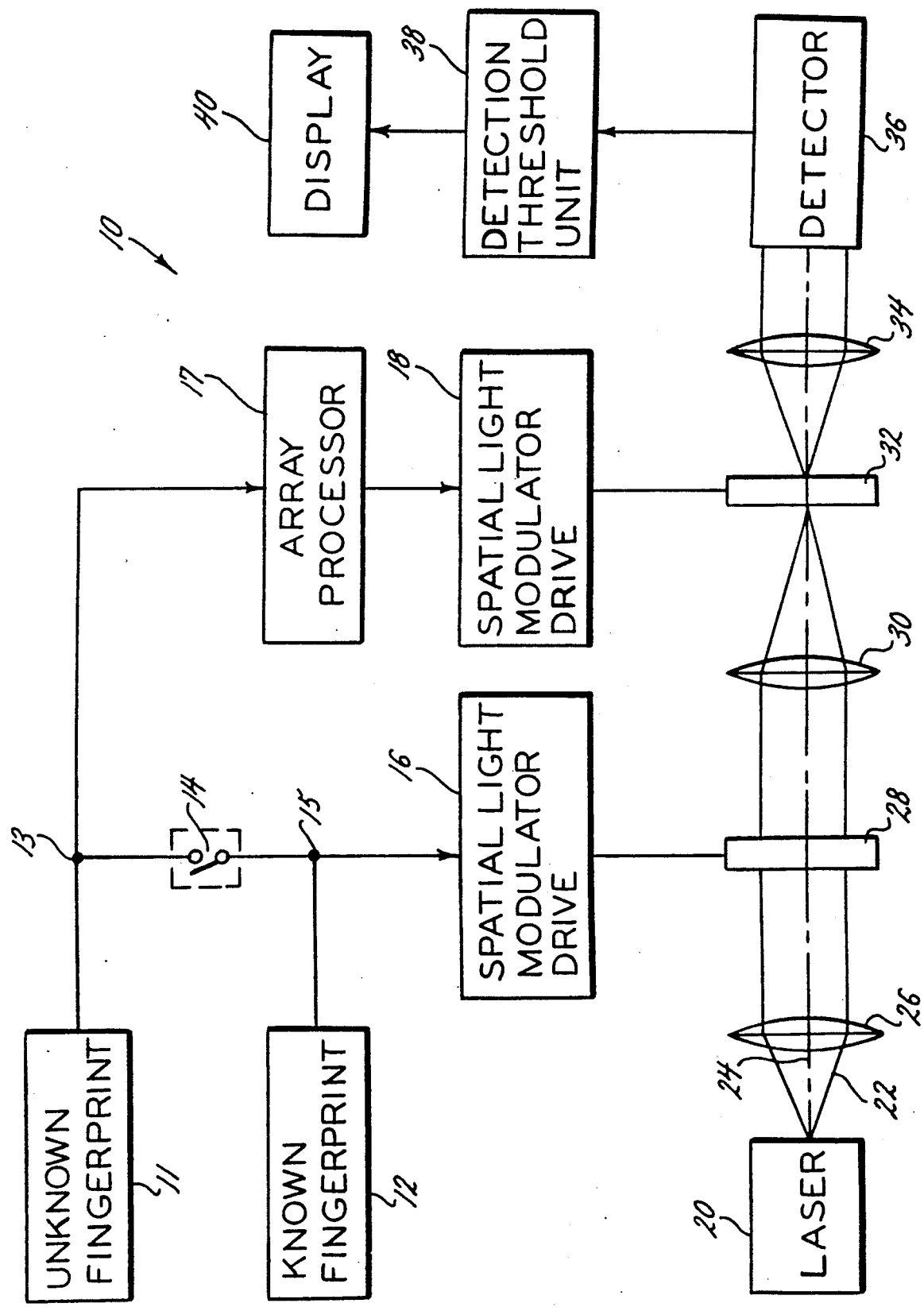

OPTICAL FINGERPRINT CORRELATOR

BACKGROUND OF THE INVENTION

The present invention relates to a fingerprint correlator, and in particular to an optical fingerprint correlator and the method for correlating fingerprints by optical means.

The prior art of fingerprint identification and correlation encompasses a wide variety of techniques for examining and comparing a large database of fingerprint information containing known fingerprint characteristics with an unknown fingerprint. Because of the large amounts of data required to characterize each individual print a substantial computer commitment is required for handling, storage, and processing of such data. Typically, fingerprint identification processing of such large amounts of data requires the use of a mainframe computer. Thus a substantial computer commitment in terms of hardware, software, operating and support expense, and processing time relating to the fact that this massive amount of data typically must be handled by serial operating computers is required. The quality of correlation possible from the use of prior art fingerprint correlation techniques is a function of the amount of data used to characterize each individual print. Thus, the more data per print, theoretically, the better the overall characterization of each print. In fact, for legal purposes, a specific number of fingerprint characteristics must be established in order for the correlation to be deemed valid. Because of the importance of fingerprint identification, large commitments of time, money, and resources are typically found to be acceptable when considered in relation to the alternative manual examination techniques of the past.

A generalized explanation of the prior art fingerprint identification process will help to provide the reader with some insight as to the complexities of the prior art process. First, an unknown fingerprint is loaded by means of a digitizing scanner, or similar device, into a computer. Second, the fingerprint information obtained from the digitizer is divided into pixels. Thus, the fingerprint image would be divided into a number of pixels, the number of which would relate to the quality of the result desired. Third, each of the pixels would be assigned a vector having magnitude and directional information in relation to the surrounding characteristics of the fingerprint. Thus, typically for each fingerprint there would be a substantial number of vectors characterizing its image. Fourth, all of the vectors of the unknown print would then be compared by the computer to the vectors of the known fingerprint. In the past, this comparison using existing computers would be performed serially, and thus can be seen to be a time-consuming process when a large number of prints would be required to be compared with the single unknown fingerprint. Fifth, the comparison results determined by the computer could then be displayed to show the quality of the match between the unknown and the known fingerprint. In the prior art, techniques have been used to shorten the process and to make it more efficient by using methods which would permit pre-sorting fingerprints by certain types of characteristics, and then zeroing in within the limited group for comparison with the unknown fingerprint. All such techniques, however, are found to be very time-consuming and expensive in terms of resource commitments.

In U.S. Pat. No. 4,790,564, an automatic method and related apparatus for identifying fingerprints is disclosed. The method and apparatus identified the fingerprints by means of comparing the minutiae of each fingerprint in a database of fingerprints with selected ones of pre-computed vector images of search minutiae in a search print to be identified. The system determines the probability of a match by comparing the position and angle of the minutiae being compared between the database file print and the unknown print.

In U.S. Pat. No. 4,690,554, the invention is a device employing the optical auto-correlation method for automatically comparing the fingerprint of an individual with a previously identified exemplar utilizing a pair of multifaceted mirrors rotating about mutually perpendicular axes to sweep an image of the fingerprint over the surface of the exemplar in a raster. A novel optical means is used to compensate for possible angular misalignment of the fingerprint and the exemplar.

U.S. Pat. No. 4,641,350 describes a fingerprint identification system which uses a scanner, a memory for storing data representative of fingerprints received from the scanner, means for comparing newly received data to reference data, and means for determining the degree of distortion and misregistration present in the new data relative to the reference data. The technique disclosed allows the reference array to be stretched and/or compressed to account for distortion or misregistration in the new data array. The new data and the reference data are stored in arrays which are compared by a method which includes dividing the reference array into subarrays and comparing the elements of each subarray with the elements of a number of subarrays of the new data array.

It can thus be seen from this brief review of the prior art that in addition to a large database and a substantial computer commitment for serial comparisons of "minutiae or substantial arrays of digitized data", a methodology and apparatus for accomplishing the correlation results desired by a less tedious and data-intensive technique would be most productive. Thus, a gross data handling methodology analogous to a parallel computer process might be considered a more desirable approach. The present invention, however, provides a methodology of handling the characterization information about each known and unknown print in such a way that parallel computing processes are either totally unnecessary or may be used to advantage to speed up the comparison process even more than without it. Thus, where under the best of conditions using prior art technology, perhaps as many as one hundred to a thousand fingerprints per minute may be compared, the present invention permits a thousand or more fingerprints to be compared per second.

SUMMARY OF THE INVENTION

It is thus an object of the present invention to speedily and accurately correlate a large number of known fingerprints with an unknown fingerprint.

It is yet another object of the present invention to provide the capacity and methodology for processing a large and legally acceptable quantity and type of fingerprint characteristic information to permit speedy and accurate correlation of indicia of known fingerprints in a pre-stored database with those indicia of an unknown fingerprint.

It is still another object of the present invention to provide a means and method of gross processing large quantities of fingerprint image information as an alternative to serial and parallel processing.

It is still another object of the present invention to provide a means and method of fingerprint correlation using each unknown fingerprint for autocorrelation calibration of the means for correlation prior to introducing known fingerprint characterization information for such correlation.

It is another object of the present invention to provide for known and unknown fingerprint correlation by optical techniques.

The present invention provides for a database of pre-stored known fingerprint images for correlation with each unknown fingerprint image introduced by digital scanner. The unknown fingerprint digitized image is simultaneously Fourier transformed both optically and digitally. The digitally transformed image becomes the matched filter which is then multiplied with the optically transformed image. The multiplied image is again Fourier transformed and the correlation indicia from this perfect or autocorrelation match is displayed or stored as user needs dictate. The known fingerprints, typically stored in a pre-digitized form are then introduced to the present invention for optical Fourier transform while the unknown print is simultaneously introduced for digital Fourier transform and provision of the matched filter. Each known print optically transformed image is multiplied with the matched filter until the desired degree of correlation is obtained in relation to the autocorrelation perfect match. The known prints are introduced serially at a high input rate, however, the substantial amount of print characterization data is transformed at one time thus contributing to the overall high throughput rate of 1000 or more prints per second compared to the lower rates known in the prior art correlation approaches.

These and other objects, benefits, and advantages of the present invention will be more readily understood when the following detailed description of the invention is viewed in light of the accompanying drawing.

BRIEF DESCRIPTION OF THE INVENTION

The accompanying drawing is a block diagram of the functional elements of the present invention.

DETAILED DESCRIPTION OF THE INVENTION

With reference to the Figure, it may be seen that the Optical Fingerprint Correlator 10, the present invention, is comprised of the unknown fingerprint loading unit 11 and the known fingerprint loading unit 12. The unknown fingerprint loading unit 11 is comprised of an image scanner, having a digital output of an eight (8) bit word for each pixel of the imaged scanned, and a memory buffer. The known fingerprint loading unit 12 is a digital storage unit such as magnetic or optical memory in a computer such as a PC (personal computer), minicomputer, or a mainframe. Pre-scanned image pixel data in the form of eight (8) bit digital words, typically one eight (8) bit word per pixel for each pixel for each print is stored in the known print loading unit 12. The unknown print loading unit 11 and the known print loading unit 12 are connected together through switch 14.

The unknown fingerprint loading unit 11 is connected through junction 13, when the switch 14 is open, to the array processor 17 which performs digital processing including Fourier and Hartley transforms on the digital array of pixel data representing the scanned image data for each fingerprint. The digital transform result for each array is communicated to the spatial light modulator drive 18 which converts the digital transform data array information it receives from array processor 17 into analog signals to activate the pixels of the spatial light modulator 32, an array display device with which it is in communication.

The unknown fingerprint loading unit 11 is connected through junction 13, when switch 14 is closed, to spatial light modulator drive 16 which is connected serially to the first spatial light modulator 28. The unknown fingerprint loading unit 11 provides image information to both spatial light modulators 28, and 32 when switch 14 is closed for the purpose of autocorrelation, that is, creating the matched filter of the unknown fingerprint loading image Fourier transformed both optically and digitally.

The known fingerprint loading unit 12 is connected through the junction 15 to the spatial light modulator drive 16. The array of digital data representing the pixels of the scanned image of a known fingerprint produced by the loading unit 12 is converted to analog signals to recreate the known fingerprint image at the spatial light modulator 28, an array display device, with which it communicates.

The optical path of the present invention as depicted in FIG. 1 has the laser 20 as a source of coherent illumination producing the beam 22 about the optical axis 24. The lens 26 is centered about the optical axis 24 to further collimate the light produced by the laser 20. The first spatial light modulator 28 is centered about the optical axis 24 next beyond the lens 26 from the laser 20 and in communication with the spatial light modulator drive 16. The first Fourier transform lens 30 is located next beyond the first spatial light modulator 28 and is centered about the optical axis 24. Next in the optical path from the laser 20 after the first Fourier transform lens 30 is the second spatial light modulator 32 which is centered about the optical axis 24. The second Fourier transform lens 34 is centered about the optical axis 24 next beyond the second spatial light modulator 32. The detector unit 36 is the last device in the optical path from the laser 20. The detector unit 36 is located for detection centered about the optical axis 24 and beyond the second Fourier transform lens 34 from the laser 20. A charge coupled device (CCD) camera having a video output may be used for the detector 36.

The detector 36 is connected to the detection threshold unit 38 which has preset threshold information in memory for determining minimum level of detector 36 output it will accept and process. Detector 36 output in excess of the preset threshold level will be converted from analog to digital for this purpose and communication to a counter, if desired, and converted back to analog levels for use by the connected display 40, which is a video monitor known to those skilled in the art.

In one preferred embodiment of the present invention, the laser 20 is a Model SP-127-35, 35 milliwatt HeNe visible laser, available from Newport Corporation, P.O. Box 8020, 18235 Mt. Baldy Circle, Fountain Valley, Calif. 92728. The first and second spatial light modulators 28 and 32, respectively, are each Model SM-128 modulators available from Semetex Corp., 3450 Fujita Street, Torrance, Calif. 90505. The spatial light modulator drivers 16 and 18 are available from Semetex Corp. (see above), and are supplied with each of the Model SM-128 modulators. The detector unit 36 is available from Cohu, 5755 Kearny Villa Road, P.O. Box 85623, San Diego, Calif. 92123. The detection threshold unit 38 is a model DT2951 frame grabber and is available from Data Translation, 100 Locke Dr., Marlboro, MA 01752.

In the preferred embodiment, the unknown fingerprint loading unit 11 which comprises an optical scanner with memory, the known fingerprint loading unit 12 comprising magnetic or optical digital storage, and the array processor 17 comprising the digital Fourier and Hartley transform capability are implemented as part of the computer (PC, minicomputer, or mainframe) used to facilitate the high speed operation of the invention.

OPERATION

Referring to the Figure, in order to prepare the Optical Fingerprint Correlator for operation, a database of known fingerprints is provided and the unknown fingerprint is introduced to the optical scanner in the unknown fingerprint loading unit 11. At junction 13 the digital pixel array data representing the unknown fingerprint is directed in two paths. The data travels through switch 14 to the first spatial light modulator drive 16 where the digital pixel data is converted to analog signals used to turn the pixels of the first spatial light modulator 28 "on" or "off". The first spatial light modulator 28 is an array display device which permits the creation of a reconstituted image of the fingerprint being processed to be communicated to the Fourier transform lens 30. The Fourier transform image of the image received from the first spatial light modulator 28 is displayed at the second spatial light modulator 32.

Simultaneous with the communication of the digital data array representing the fingerprint being processed through the switch 14, the same data is communicated to the array processor 17. The array processor 17 performs a digital Fourier transform on the digital data array and sends the resultant digital transform array, which is the matched filter for the optically transformed image, to the second spatial light modulator 32 where it is multiplied with the optically Fourier transformed image arriving from the Fourier transform lens 30. The multiplied image, the result of the optical Fourier transformed image and the digitally produced matched filter being brought together at the second spatial light modulator 32 results from the single fingerprint input being processed for autocorrelation, as above-described. The multiplied image is communicated to the second Fourier transform lens 34 and the resultant correlation image captured by the image detector 36. The correlation peaks, the indicia of correlation for the particular fingerprint being processed is passed through the detection threshold unit 38 to set threshold levels for correlation acceptance and then provided to the display 40 for operator visualization. The image at the detector 36 represents a match or correlation since the same fingerprint was simultaneously processed through the optical Fourier pathway via the first spatial light modulator 28 and the digital Fourier pathway via the array processor 17. This autocorrelation process, in essence, creates a matched filter for calibration of the present invention for each unknown fingerprint being compared or correlated with a known fingerprint being stored as a visual image, requiring scanning and digitizing in the known fingerprint loading unit 12, or as pre-scanned and digitized data stored in digital storage media such as magnetic or optical disk, cards, tape or equivalent employed in loading unit 12.

Thus, when a matched filter is produced from the autocorrelated image of an unknown fingerprint and displayed at second spatial light modulator 32, and with switch 14 then open, known fingerprints stored as visual images and then scanned and digitized or pre-digitized stored known fingerprint images can be processed through spatial light modulator drive 16 for electronic recreation at the first spatial light modulator 28. The re-created or re-constructed known fingerprint image is then projected to the first Fourier transform lens 30 resulting in the Fourier transformed image of the known fingerprint being presented to the image plane within which the matched filter of the unknown fingerprint resides at the second spatial light modulator 32. The combined or multiplied images are Fourier transformed at Fourier transform lens 34 to produce correlation peaks or indicia indicative of a match or near match, if any, at detector 36. The detected indicia are then processed by detection threshold unit 38 for presentation at display 40 or a legally or operationally desirable alternative device for examining correlation indicia.

It should be obvious to those skilled in the art that the implementation and mechanization of the fingerprint correlator of the present invention can be varied considerably to enhance its performance without going beyond the bounds of the invention as hereafter claimed. As an example, the known fingerprint loading unit 12 if constituted to contain pre-digitized fingerprint image data can speed up correlation processing by the invention considerably greater than if visual images requiring scanning and digitizing are stored. This is believed to be true even where the highest speed scanners available to date are used. Also, the detection threshold unit 38 may be considered as an optional element if the detector 36 is capable of directly driving the display 40.

What we now claim as our invention is:

1. An apparatus for correlating fingerprints and producing correlation indicia, said apparatus comprising:
   a means for introducing a known fingerprint image to said apparatus;
   a means for introducing an unknown fingerprint image to said apparatus;
   a switching means for connecting the outputs of said means for introducing a known fingerprint and said means for introducing an unknown fingerprint, said switching means having a first side connected to said means for introducing an unknown fingerprint and a second side connected to said means for introducing a known fingerprint;
   a first means for producing spatial light modulation;
   a second means for producing spatial light modulation disposed coaxially in optical alignment with said first means for producing spatial modulation;
   a first spatial light modulator drive connected between the second side of said switching means and said first means for producing spatial light modulation;
   a means for producing a matched filter from said unknown fingerprint image, said means for producing a matching filter having an input and an output, said input being connected to the first side of said switching means;
   a second spatial light modulator drive connected between the output of said means for producing a matched filter and said second means for producing spatial light modulation;

a first Fourier transform lens coaxially disposed in optical alignment with and between said first and second means for producing spatial light modulation;

a second Fourier transform lens coaxially disposed in optical alignment with and on the side of said second means for producing spatial light modulation opposite the side facing first Fourier transform lens;

a means for detecting correlation indicia, said means for detecting correlation indicia being disposed coaxially in optical alignment with said second Fourier transfer lens and on the opposite side of said lens from said second means for producing spatial light modulation;

a means for displaying said indicia of correlation, said means for displaying said indicia connected to said means for detecting correlation indicia; and a means for providing collimated coherent light to and disposed coaxially in optical alignment with said first means for producing spatial modulation.

2. The apparatus of Claim 1 wherein said means for providing collimated coherent light to said first means for producing spatial light modulation, comprises;
a laser, and
a collimating lens disposed coaxially in optical alignment with and between said laser and said first means for producing spatial light modulation.

3. The apparatus of claim 2 wherein said means for introducing a known fingerprint image to said apparatus comprises a storage unit for predigitized images.

4. The apparatus of claim 3 wherein said means for introducing a pre-digitized known fingerprint image, comprises:
a digital data storage media, and
a computer controllably communicating with and between said storage media and said first spatial light modulator drive.

5. The apparatus of claim 4 wherein said means for introducing an unknown fingerprint image to said apparatus, comprises an optical image scanner which produces digital data as an output.

6. The apparatus of claim 5 wherein said first means for producing spatial light modulation comprises an array display device having pixels activated by the digital data corresponding to the pixels of the scanned and digitized fingerprint image input, said digital pixel data provided from said array by said first spatial light drive.

7. The apparatus of claim 6 wherein said means for producing a matched filter comprises a digital Fourier and Hartley transform array processor.

8. The apparatus of claim 7 wherein said second means for producing spatial light modulation comprises an array display device having pixels activated by the digital transform data from said means for producing a matched filter.

9. The apparatus of claim 8 wherein said means for detecting correlation indicia is a charge coupled device (CCD).

10. The apparatus of claim 9 wherein said charged coupled device is a CCD camera having a video output.

11. The apparatus of claim 10 wherein said means for displaying said indication of correlation is a video monitor.

12. The apparatus of claim 11 further comprising a means for setting a detection threshold level for excluding detected levels of correlation indicia below said level.

13. The apparatus of claim 12 wherein said means for setting a correlation indicia detection threshold further comprises an analog to digital to analog conversion means for processing detected levels of correlation indicia above said threshold to said video monitor.

14. An apparatus for correlating fingerprints and producing correlation indicia, said apparatus comprising:

a means for providing digitized unknown fingerprint images;

a means for providing digitized images of known fingerprints;

a separate means for simultaneously performing a digital and an optical Fourier transform on a digitized unknown fingerprint image and producing an unknown fingerprint matched filter;

a means for changing digitized known finger-prints to analog images;

a means for performing an optical Fourier transform on each known analog fingerprint image;

a means for optically correlating and detecting the indicia of correlation of each of said optical Fourier transform known fingerprint matched filter; and a means for displaying the indicia of correlation for each known fingerprint image with the unknown fingerprint image.

15. The apparatus of claim 14 further comprising a means for presetting the threshold level for correlation indicia corresponding to a match of a known with an unknown fingerprint.

16. A method for correlation of an unknown fingerprint with a known fingerprint combining optical and digital techniques and coherent illumination, said method comprising the steps of:

a. digitizing the unknown fingerprint image;

b. simultaneously performing an optical Fourier transform on the incoming two-dimensional image of a reconstructed image from the digital image of the unknown fingerprint, and a digital Fourier transform on the digitized unknown fingerprint image, said digital Fourier transformed image comprising a matched filter of said unknown fingerprint image;

c. combining by optical multiplication said optical Fourier and digital Fourier transform images;

d. performing an optical Fourier transform on said combined optical and digital Fourier transformed image to produce indicia of autocorrelated and perfect match correlated unknown fingerprint images;

e. displaying the visual correlation indicia of the aforesaid autocorrelation;

f. maintaining the digitized unknown fingerprint input and digital Fourier transform of same to maintain said matched filter;

g. introducing a digitized image of a known fingerprint image;

h. reconstructing an analog visual image of said known fingerprint;

i. performing the optical Fourier transform of said known fingerprint image;

j. multiplying the optical Fourier transform of the known fingerprint image with the matched filter of said unknown fingerprint image;

k. performing the optical Fourier transform of said multiplied image of said known and unknown fingerprint transform images; and l. displaying the correlation indicia of said known and unknown multiplied and transformed fingerprint images for comparison of said unknown to known with said unknown to unknown correlation indicia.

* * * * *